United States Patent [19]

Murphy

[11] 4,310,964
[45] Jan. 19, 1982

[54] METHOD AND APPARATUS FOR THE AUTOMATED ASSEMBLY OF MAJOR SUBASSEMBLIES

[75] Inventor: Richard J. Murphy, Bellevue, Wash.

[73] Assignee: The Boeing Company, Seattle, Wash.

[21] Appl. No.: 92,074

[22] Filed: Nov. 5, 1979

Related U.S. Application Data

[62] Division of Ser. No. 915, Jan. 2, 1979, Pat. No. 4,203,204.

[51] Int. Cl.³ .................. B23P 11/00; B23P 21/00
[52] U.S. Cl. .................. 29/469; 29/155 R; 29/526 A; 29/703; 29/281.1; 29/431; 29/565
[58] Field of Search ............ 29/469, 464, 514, 526 A, 29/33 R, 155 R, 703, 704, 33 K, 56.5, 56.6, 28 A, 559, 462, 418, 428, 467, 281.5; 408/12, 13, 3; 227/2-5

[56] References Cited

U.S. PATENT DOCUMENTS

| | | | |
|---|---|---|---|
| 1,877,023 | 9/1932 | Northrop | 29/462 |
| 2,430,438 | 11/1947 | Watter et al. | 29/469 |
| 3,052,140 | 9/1962 | Guyer, Jr. | 29/155 R X |
| 3,507,025 | 4/1970 | Aukeney | 29/155 R |
| 4,203,204 | 5/1980 | Murphy | 29/703 |
| 4,220,275 | 9/1980 | Hametner et al. | 227/5 |

*Primary Examiner*—Milton S. Mehr
*Attorney, Agent, or Firm*—Christensen, O'Connor, Johnson & Kindness

[57] ABSTRACT

The automated assembly of major subassemblies providing for the rapid assembly of parts in predetermined positions by automatically tack fastening (e.g., riveting) mounted parts together or by automatically drilling holes in mounted parts and manually locating other parts is disclosed. After the initial locating steps are completed, assembled parts are permanently fastened together. At each tack or permanent fastener location the automated assembly machine: clamps the parts together with a predetermined amount of force; determines the composite thickness of assembled parts to be fastened together; drills a hole through the assembled parts; selects the correct length fastener to be inserted into the hole; inserts the selected fastener into the hole; secures the selected fastener; and, moves to the next position and repeats this sequence of operations. The illustrated automated assembly machine includes part holding devices (41) mounted on a machine frame (11). The part holding devices (41) support a major subassembly (43) to be riveted in a vertical plane. Opposing carriage mechanisms (63, 65) are located on opposite sides of the supported subassembly. Each carriage mechanism includes a main carriage that is movable in an X-Y manner over its related face of the subassembly. Each main carriage supports either a clamp carriage (141) or a back-up carriage (142) that is movable toward and away from the subassembly (43). The clamp and back-up carriages (141, 143) support shuttle carriages (171). The shuttle carriages, in turn, support: a sensor (200) for sensing part contact; a drill (198) for drilling holes through the assembled parts; an inserter (197) for inserting rivets in the holes; and upset mechanisms (196a, 196b) for upsetting the rivets. The position of the various carriages and the operation of the sensor, drill, rivet inserter and upset mechanisms are controlled by a numerical controller (205) that automatically: positions the main carriages; moves the clamp and back-up carriages into a position such that the region of the subassembly to be riveted is tightly clamped; causes a hole to be drilled; and, a rivet to be selected, inserted and upset. In addition, the numerical controller (205) causes the part holding devices to be released when a rivet is to be inserted in the region of a particular part holding device.

8 Claims, 12 Drawing Figures

METHOD AND APPARATUS FOR THE AUTOMATED ASSEMBLY OF MAJOR SUBASSEMBLIES

This is a divisional of application Ser. No. 915, filed Jan. 2, 1979, now U.S. Pat. No. 4,203,204, issued 5/20/80.

TECHNICAL FIELD

This invention is directed to automated assembly machines and, more particularly, to automated assembly machines adapted to precisely locate the component parts of a major subassembly and sequentially drill holes in assembled parts, insert fasteners in the drilled holes and secure the inserted fasteners.

BACKGROUND OF THE INVENTION

While a wide variety of machines for automatically fastening both large and small assemblies of parts together have been proposed by the prior art, for various reasons, such machines have proven to be unsuitable for use in many environments, particularly environments wherein the resultant subassembly is a major subassembly. As a result, many major subassemblies are, essentially, produced by hand, i.e., manually. For example, major aircraft subassemblies, such as wing spars for commercial air transports (which have lengths falling in the 50-100 foot range), are currently produced by skilled personnel with the aid of complex assembly tools. First, the component parts are manually positioned in the assembly tool. (The assembly tool is designed so that the parts are correctly positioned.) Next, drill plates, used to locate fastener holes, are mounted on the tool and/or the assembled parts. The fastener holes are then drilled, using manually operated equipment. The parts are next disassembled, cleaned, deburred, sealed and reassembled. Fasteners are then installed using manually operated riveting equipment. This assembly method has not basically changed since World War II, when large aircraft were first designed and produced.

Obviously, the foregoing method of assembling major aircraft assemblies has a number of disadvantages. One obvious disadvantage is that the parts must be assembled for drilling, then disassembled for cleaning and deburring, and finally reassembled for riveting, all of which is manually time consuming and, therefore, expensive.

Another major disadvantage of the foregoing assembly method is the high cost of producing and maintaining the assembly tooling. In this regard, it has been determined that the tooling used to build one spar of one wing of a modern commercial jet aircraft required approximately 45,000 man hours to design and fabricate. Maintenance of this tooling and modifying the tooling to accommodate model changes and customer variables required approximately 21,000 man hours over an eight-year period of time.

Because of the extremely high initial costs associated with producing major subassembly tooling, and because of the high costs of maintaining, modifying and using such tooling, various attempts have been made to automate at least the riveting of major subassemblies. However, at best, prior art machines have provided very limited solutions to the problem. In one system, subassemblies are first completely preassembled and entirely manually tack fastened together. Thereafter, fastener locations are established either manually by alignment to marks on the parts of the subassembly or by a rudimentary system of numerical control, which spaces fasteners between tack locations. In both instances, fastener positions are imprecise at best.

Furthermore, many prior art riveting machines move the subassembly, rather than the riveting mechanism. While such machines are useable when the subassembly is small, as the size of the subassemblies increase they become increasingly less useful because, due to inertia, large subassemblies cannot be rapidly moved from position to position. Those prior art machines that move the riveting mechanism, rather than the subassemblies, also have disadvantages. Specifically, in most such machines the riveting mechanism is massive and, therefore, slow moving. Not only are the riveting mechanisms slow moving because they are massive, they are also difficult to position.

Another difficulty with many prior art automated riveting machines is their inability to rivet (fasten) all of the parts of a major subassembly together in a minimal number of passes, regardless of the composite thickness of the parts at particular riveting points. This limitation occurs because of the inability of such machines to select a rivet of suitable length based on the composite thickness of the parts. As a result, all the rivets of a particular length must be inserted and upset at one time, followed by the installation of rivets of a different length, etc., until all of the rivets have been inserted and upset. Obviously, this approach requires that the machine pass over the surface of the part several times during an entire assembly operation, which is slow and, therefore, undesirable.

Therefore, it is an object of this invention to provide a new and improved method and apparatus for the automated assembly of major subassemblies.

It is also an object of this invention to provide a method and apparatus for the automated assembly of major subassemblies that provides for the rapid, easy and precise positioning of parts to be riveted together.

It is another object of this invention to provide an automated assembly machine for major subassemblies that quickly and rapidly performs all of the steps necessary to fasten the parts of a subassembly together at predetermined points prior to being indexed to the next fastener location.

It is a still further object of this invention to provide a new and improved automated fastening machine for major subassemblies wherein the major subassembly remains stationary while a mechanism rapidly and quickly performs all of the steps necessary to permanently fasten tacked together parts of the subassembly at different locations during a pass over the surface of the subassembly.

SUMMARY OF THE INVENTION

In accordance with this invention, a method and apparatus for the automated assembly of major subassemblies is provided. The automated assembly method and apparatus provides for the precise positioning and the automatic fastening of at least some of the components of the subassembly. (In the case of a spar, these parts would comprise the web and the chord.) If additional components (e.g., stiffeners, fittings, brackets etc.) are to be added, they are located on the assembled components using alignment holes preformed in the additional parts and alignment holes automatically formed in the previously assembled components. Thereafter all of the assembled components are automatically fastened together by the installation of additional (permanent) fasteners. At each fastener position movable mechanisms: clamp the parts together; sense the composite thickness of the parts; drill a hole through the assembled parts; select the correct length fastener; insert the selected fastener; and, secure the fastener. Thereafter the movable mechanisms are moved to the next fastener position.

The preferred embodiment of an automated assembly machine formed in accordance with the invention includes part holding devices mounted on a machine frame for supporting the components of a major subassembly (e.g., a wing spar of an aircraft) in a predetermined (e.g., vertical) plane. Located on opposing sides of the major subassembly are carriage mechanisms. Each carriage mechanism includes a main carriage that is movable in a Cartesian coordinate (e.g., X-Y) manner over the adjacent face of the major subassembly. Mounted on each main carriage is either a clamp carriage or a back-up carriage. The clamp and back-up carriages are movable toward and away from one another and, thus, toward and away from the major subassembly. Mounted on the clamp and backup carriages are shuttle carriages. The shuttle carriages support mechanisms adapted to sense part contact, drill a hole through the assembled parts, insert a rivet (fastener) into the drilled hole and upset the rivet (secure the fastener).

In accordance with further aspects of this invention, preferably, the main carriages actually comprise two carriages—a horizontal carriage and a vertical carriage. The horizontal carriage is mounted on the frame of the automated riveting machine and moves in a horizontal direction across the face of the major subassembly. The vertical carriage is mounted on the horizontal carriage and moves in a vertical direction. In addition, the shuttle carriage moves in a horizontal direction.

In accordance with still further aspects of this invention, preferably, a part contact sensor, a drill, a rivet (fastener) inserter and an upset (securing) mechanism are mounted on the shuttle carriages for independent movement toward and away from the major subassembly. More specifically, the shuttle carriages horizontally move the required item to a position in front of the subassembly where the particular operation is to take place. Thereafter, the item, e.g., part contact sensor, drill, rivet inserter or upset mechanism is moved (or a required element thereof is moved) toward the major subassembly and the operation is performed. After the operation is complete, the item is withdrawn to its retracted position.

In accordance with still further aspects of this invention, the part holding devices that support the major subassembly in the desired position are formed such that a holding element can be withdrawn when it is desired to rivet (fasten) the subassembly in the region of the holding element and the holding element, if remaining in its holding position, would prohibit riveting (fastening).

In accordance with still further aspects of this invention, the automated assembly machine of the invention includes a numerical controller for controlling the operation of the various mechanisms of the invention, e.g., the carriages, the part contact sensor, the drill, the rivet inserter, the upset mechanism and the part holding devices.

It will be appreciated from the foregoing brief summary that the invention provides an uncomplicated method and apparatus for the automated assembly major subassemblies. The components of the major subassembly are rapidly aligned at precise locations and partially fastened together. Thereafter the installation of additional fasteners is accomplished by automatically determining the thickness of the assembled components at each fastener location, drilling a hole through the assembled components, selecting the correct length fastener (e.g., rivet), inserting the selected fastener and securing the fastener. Once the components of a major subassembly are tack fastened in position, all of these operations are performed in a sequential manner at each location where a fastener is desired, based on position information stored in a punched or magnetic tape, or a magnetic disc, for examples. The components do not need to be disassembled after being assembled and tack fastened together because they are clamped together at each fastener position with a force adequate to prevent burrs from forming between the components. Moreover, large, expensive assembly tooling is not required. Rather, all that is required is a support mechanism for supporting the major subassembly in a predetermined position. The major subassembly both during the component location sequence and during the final fastening sequence is automatically fastened at fastener positions controlled by a numerical controller. Preferably, the controller receives the position information from a magnetic disc reader, which reads a plastic disc. That is, the controller not only controls the fastening steps, preferably, it also controls part or all of the tack fastening steps or, in some instances the drilling of holes for manual tack fastening. As will be readily appreciated by those skilled in the numerical control machinery art, the production and maintenance of magnetic discs (or some other storage medium), from a capital investment point of view, is substantially less than the production and maintenance of assembly tooling.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

While the following description of a preferred embodiment of an automated assembly machine formed in accordance with the invention is directed to a machine for installing rivets, it is to be understood that machines for installing other types of fasteners can also be formed in accordance with the invention. For example, machines for installing what are generally referred to as bolts in the aircraft industry (e.g., PT Bolts, taper lock bolts, lock bolts, Hi-Loks, RivBolts, etc.) can also be formed in accordance with the invention. Further, it is to be understood that the method and apparatus of the invention can be used to form major subassemblies other than the wing spar subassembly illustrated and described. Also, the invention can be used in industries other than the aircraft industry.

As will be more fully understood from the following description, an automated assembly machine for major subassemblies formed in accordance with the invention includes two major subsystems or portions—a mechanical portion and an electronic control portion. The mechanical portion supports the assemblage of components to be fastened together to form the major subassembly; and, the mechanism for fastening the components together. The electronic control portion controls the operation of the mechanical portion.

Figures 1, 2, 8:
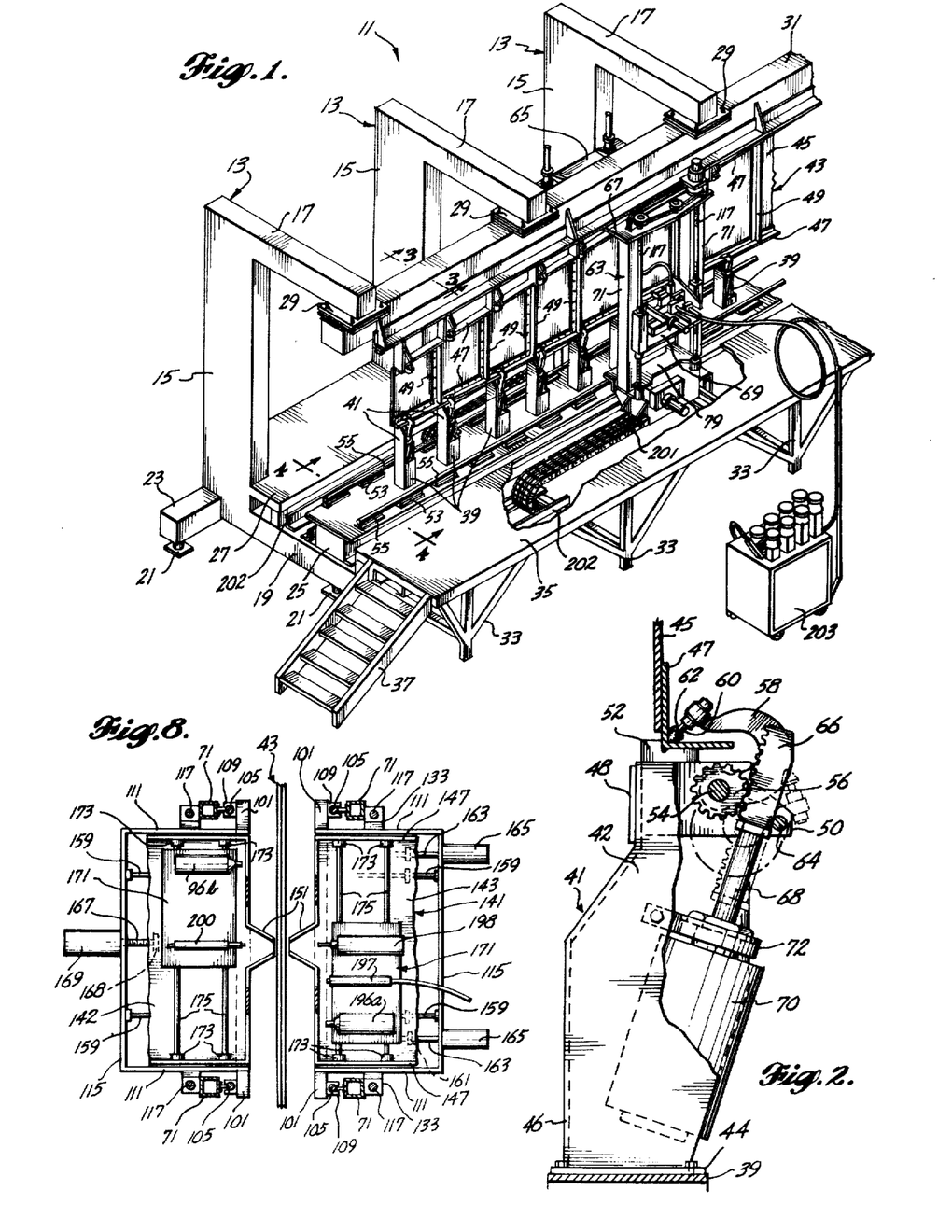
FIG. 1 is a pictorial view of a preferred embodiment of the mechanical portion of an automated assembly machine formed in accordance with the invention.
FIG. 2 is a cross-sectional view, partially broken away, illustrating a part holding device formed in accordance with the invention for supporting a major subassembly.
FIG. 8 is a simplified plan view illustrating mechanisms for sensing the thickness of a part, drilling a hole to the part, inserting a rivet and upsetting the rivet mounted on shuttle carriages that are mounted on clamp and back-up carriages all formed in accordance with the invention.
Figure 3:
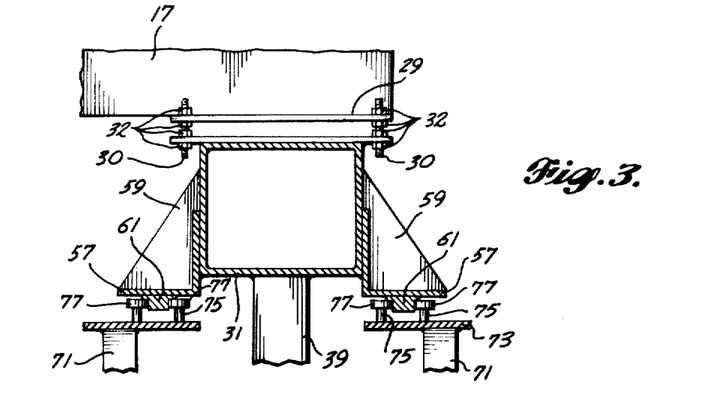
FIG. 3 is a cross-sectional view taken along line 3—3 of FIG. 1.

FIG. 1 is a pictorial view of the mechanical portion of a preferred embodiment of an automated assembly machine formed in accordance with the invention and includes a framework 11. The framework 11 comprises a plurality of parallel, spaced apart C-shaped frames 13, each of which includes a vertical beam 15 and upper and lower horizontal beams 17 and 19. The C-shaped frames are illustrated as supported by short adjustable legs 21 attached to the lower horizontal beam 19 and to horizontal arms 23 affixed to the bottom of the vertical beam 15. Mounted atop the lower horizontal beams 19 so as to span the C-shaped frames 13 is a lower pedestal beam 25, illustrated as a hollow I-beam. Also mounted on the base beams 19 so as to surround the vertical beams 15 is a rear platform 27. The rear platform 27 is spaced from the lower pedestal beam 25. Mounted on flanges 29 affixed to the lower surface of the outer ends of the upper horizontal beams 17 so as to span the C-shaped frames 13 is an upper pedestal beam 31, which may be a box beam, as best seen in FIG. 3. The upper pedestal beam 31 may be attached to the flanges 29 by threaded vertical shafts 30 and positioning nuts 32, for example, to allow the height of the upper pedestal beam to be adjusted.

Legs and frame support members 33 support a front platform 35 adjacent the outer edge of the lower pedestal beam 25, but spaced therefrom. Stairs 37 are located on one end of the front platform 35.

Vertically mounted on the lower and upper pedestal beams 25 and 31 are a series of aligned pedestals 39. More specifically, a series of lower pedestals are mounted atop the lower pedestal beam 25 and a series of upper pedestals are mounted beneath the upper pedestal beam 31. Only the lower pedestals 39 can be seen clearly in FIG. 1. Mounted atop the lower pedestals 39 and beneath the upper pedestals 39 are part holding devices 41, best illustrated in FIG. 2 and hereinafter described. The pedestals 39 may be of uniform or nonuniform height, depending upon whether or not the major subassembly has parallel or nonparallel longitudinal edges. In any event, the part holding devices 41 support the major subassembly in a vertical plane. In this regard, the specific major subassembly illustrated in FIG. 1 is a spar 43, which comprises a vertically oriented web 45, chords 47 extending along the upper and lower longitudinal edges of the web 45 and a plurality of transversely positioned stiffeners 49.

The part holding devices 41 mounted on the upper and lower pedestals 39 include a housing, as best illustrated in FIG. 2. The housing includes a pair of sidewalls 42, a base 44 and a back wall 46. The base is bolted to the related pedestal 39. The edge of the sidewalls, which is enclosed by the backwall 46, rises vertically for a predetermined distance, then tapers inwardly over the base 44 for a predetermined distance and, finally, rises vertically for a predetermined distance. The top and front of the housing are, essentially, open. The top vertical section of the back wall 46 is reinforced by a reinforcing plate 48. The sidewalls 42, near the top of the housing, include reinforcing flanges 50 that extend outwardly beyond the open front of the housing. Mounted across the open top of the housing is a support block 52. The support block 52 is generally L-shaped and has a short vertical leg and a longer horizontal leg. The junction between the short and long legs may be relieved, if desired.

Rotatably mounted in the flanges 50 so as to extend across the upper region of the housing is a shaft 54. Affixedly mounted on the shaft 54 so as to lie in the housing is a pinion gear 56. The shaft extends beyond the outer surface of one of the flanges 50. Affixedly mounted on the outer extension of the shaft 54 is one end of a C-shaped clamp arm 58. The other end of the C-shaped clamp arm supports a position adjustable threaded shaft 60 having a resilient bumper 62 mounted on one end. The C-shaped clamp arm lies in a plane orthogonal to the plane of the shaft 54 and the axis of the threaded shaft 60 lies orthogonal to, but spaced from, the axis of the shaft 54. The resilient bumper 62 is mounted on the tip of the threaded shaft lying "inside" of the C-shaped clamp arm. Extending across the outer end of the support plates 50 is a rod 64. The axis of the rod 64 is parallel to the axis of the shaft 54 and the rod is spaced from the shaft. Mounted in the space between the rod 64 and gear 56 is a rack 66. The rod/gear spacing is such that the teeth of the rack 66 engage the teeth of the gear 56. The lower end of the rack 66 is longitudinally attached to the end of the shaft 68 of a pneumatic actuator 70. The actuator 70 is supported by a flange 72 mounted between the sidewalls 42 of the housing.

In operation, when the pneumatic actuator 70 is energized, its shaft 68 moves in one direction or the other in a conventional manner. As the shaft 68 moves, the rack 66 moves back and forth. Because the teeth of the rack 66 engage the teeth of the gear 56, the gear rotates as the rack moves. Since the gear is affixed to the shaft, the shaft 55 rotates when the gear rotates. Because the end of the C-shaped clamp arm 58 is affixed to the shaft 54, as the shaft 54 rotates, the C-shaped clamp arm 58 moves between the phantom and solid line positions illustrated in FIG. 2. In the solid line position, the bumper 62 is adapted to press the corner of the chord 47 of the major subassembly into the corner of the support block 52. In this manner, the part holding devices 41 are adapted to support the chords of the major subassembly, which are tacked to the web. Thus, the web 45 and elements attached to the web (e.g., stiffeners 49) are supported by the pedestals 39. As will be better understood from the following discussion, actuation of the pneumatic actuators 70 is under the control of an electronic controller. As a result, the clamp arms 58 can be released when a fastener (e.g., rivet) is to be installed in the area of a subassembly covered by a particular clamp arm.

Figures 4, 5:
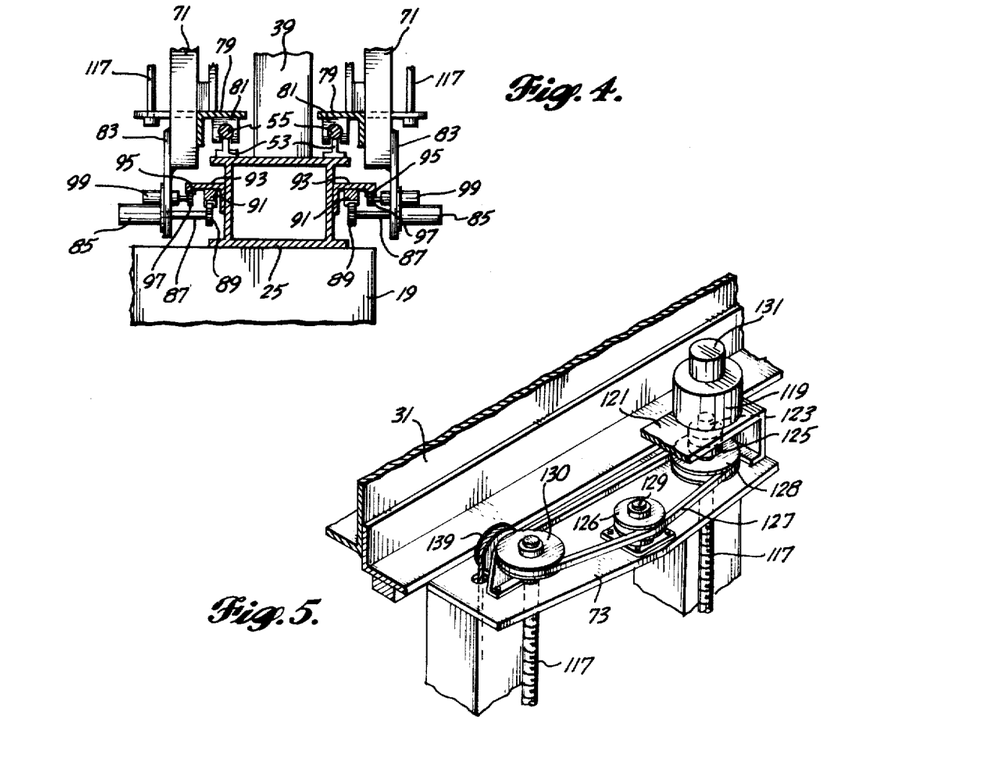
FIG. 4 is a cross-sectional view taken along line 4—4 of FIG. 1.
FIG. 5 is an enlarged perspective view of the top of a horizontal carriage forming a part of the mechanical portion of the automated riveting machine illustrated in FIG. 1.

Mounted on the upper surface of the lower pedestal beam 25, adjacent the longitudinal edges thereof, are main carriage assembly guides and supports. As shown in FIGS. 1 and 4, the main carriage assembly guides and supports comprise a plurality of spaced, T-shaped support blocks 53 and a cylindrical rail 55. The T-shaped support blocks are mounted in an inverted position and the legs of the T-shaped support blocks support the cylindrical rail 55.

As shown in FIGS. 1 and 3, affixed to both outer vertical surfaces of the upper pedestal beam 31 are angle beams 57. Affixed to the lower surface of each angle beam 57 is an elongate, rectangular upper guide rail 61. The size and position of the upper pedestal beam 31 and the angle beams 57 are such that the upper guide rails lie directly above the cylindrical guide rails 55 mounted on the lower pedestal beam 25. Preferably, reinforcing ribs 59 extend between the outer vertical surfaces of the upper pedestal beam 31 and the angle beams 57, and the upper horizontal surfaces of the angle beams 57.

The cylindrical lower guide rail 55 and the upper guide rail 61 support and guide front and rear carriage mechanisms 63 and 65. Each of the carriage mechanisms 63 and 65 includes a main carriage comprising a horizontal carriage 67 and a vertical carriage 69. As will be better understood from the following discussion, the horizontal carriages support the vertical carriages and each vertical carriage supports either a clamp carriage or a back-up carriage, which, in turn, supports a shuttle carriage. Except for minor differences hereinafter described, the horizontal, vertical, clamp (or back-up) and shuttle carriages of each carriage mechanism are substantially the same.

The horizontal carriages 67 each comprise a pair of spaced, vertically oriented, hollow square tubes 71. An upper plate 73 joins the upper ends of the vertical columns 71. The upper plate 73 of each horizontal carriage extends under the upper guide rail 61 as illustrated in FIG. 3. Extending upwardly from each upper plate 73 are a plurality of shafts 75 on which rollers 77 are mounted. The shafts and the rollers are positioned along the upper guide rails 61 such that the rollers ride on the inner and outer vertical surfaces of the upper guide rails 61.

Extending across (and affixed to) the vertical columns 71 of the horizontal carriage 67, near the lower end thereof, is a lower plate 79, best seen in FIG. 4. The lower plate includes flanges that overlie the cylindrical lower rail 55. The flanges support bearing blocks 81 that surround the cylindrical lower rail 55. Extending downwardly from the outer surface of the lower end of the columns 71 of each horizontal carriage 67, beneath the lower plate 79, is a vertical plate 83. The vertical plates 83 are attached to the vertical columns 71 and support electric motors 85 having horizontal shafts 87. Mounted on the outer end of each horizontal shaft 87 (which extends toward the lower pedestal beam 25 as shown in FIG. 4) is a pinion gear 89. The pinion gears lie beneath main racks 91 mounted on an elongate angle support rail 93. More specifically, an angle support rail 93 is mounted on each of the vertical edges of the lower pedestal beam 25. The main racks are mounted on the angle support rails such that a main rack 91 parallels the lower pedestal support beam 25 on each side thereof. Mounted on the outer end of each angle support member 93 is an elongate encoder rack 95. Thus, the encoder racks also parallel the lower pedestal beam 25. The encoder racks 95 operate pinion gears 97 mounted on the outer end of the shafts of encoders 99, which are supported by the vertical plates 83.

It will be appreciated from the foregoing description that, when the motors 85 are energized, the coaction between the motor pinion gears 89 and the main racks 91 cause the horizontal carriages 81 to horizontally move back and forth. Such movement is sensed by the encoders 99 as a result of the coaction between the encoder pinion gears 97 and the encoder racks 95. Horizontal carriage support is provided by the lower cylindrical rails 55; and, the upper end of the horizontal carriages are guided by the rollers 77 coacting with the upper guide rails 61.

A vertical carriage 69 (best seen in FIG. 6) is mounted on each horizontal carriage 67 and each vertical carriage 69 includes a frame comprising a lower channel 101 and an upper channel 103. The upper and lower channels lie along parallel horizontal axes, on the side of the columns 71 of the horizontal carriage facing the subassembly to be riveted. More specifically, mounted on each of the columns 71 of the horizontal carriages 67, on the side facing the subassembly to be riveted, is a vertical cylindrical guide rail 105 supported by T-shaped support elements 107. Specifically, the cross members of the T-shaped support elements are attached to the surface of the column 71 and the tips of the legs of the T-shaped support elements support the cylindrical, vertical guide rails 105. Slidably mounted on the cylindrical guide rails 105 are bearings 109, which are mounted on the facing surfaces of the lower and upper channels 101 and 103.

Sidewalls 111 extend between the upper and lower channels 101 and 103 and outwardly so as to lie between the columns 71 of the horizontal carriage. A top wall 113, which also lies between the columns 71, connects the sidewalls 111. In addition, a horizontal cross-member 115 (FIG. 7) connects the lower outer peripheral corner of the sidewalls 111. In the illustrated embodiment of the invention, the outer edge of the sidewalls are inclined between the cross member 115 and the top wall 113. Further, the rear edge of the outer regions of the top wall 113 taper inwardly.

Rotatably mounted in the upper and lower plates 73 and 79 of the horizontal carriage 67, so as to lie parallel to and slightly outwardly from the vertical columns 71, are elongate threaded shafts 117. The threaded shafts 117 are rotated by a motor 119 mounted on a bracket 121 supported by the upper plate 73. More specifically, the bracket supports the motor 119 so that the shaft 123 of the motor is vertical as shown in FIG. 5. The vertical shaft 123 is coupled by a suitable coupler 125 to one of the threaded shafts 117. The other threaded shaft 117 is coupled to the motor driven threaded shaft 117 by a belt 127. The belt extends around a drive pulley 128 mounted on the motor driven threaded shaft 117, a driven pulley 130 mounted on the other threaded shaft 117 and an idler pulley 126 mounted on a shaft 129 extending vertically upwardly from the upper plate 73 of the horizontal carriage. Mounted on the motor 119, so as to be operated by the motor shaft, is an encoder 131.

Affixed to the outer surfaces of the sidewalls 111 of the vertical carriage 69 are boxes or frames 133. The boxes or frames 133 are elongate (vertically) and surround the adjacent portion of the threaded shafts 117. Ball nuts 134 are mounted at the vertical ends of the boxes or frames. The ball nuts are threaded onto the threaded shafts 117. As a result, when the threaded shafts 117 are rotated in one direction or the other, due to the motor 119 being energized, the coaction between the threaded shafts 117 and the nuts causes the vertical carriage to be raised or lowered. The position of the vertical carriage is indicated by the output of the encoder 131.

Figures 6, 7:
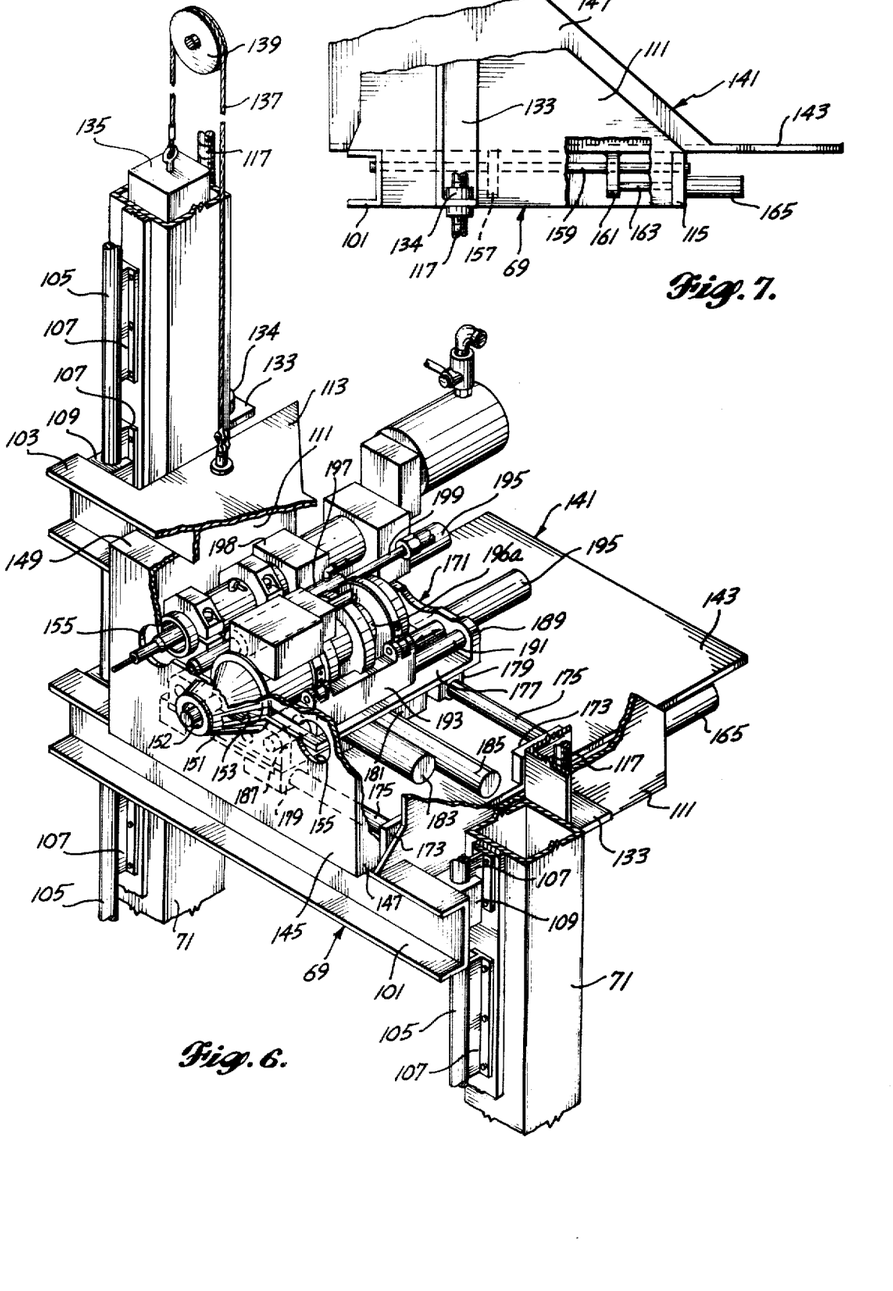
FIG. 6 is a perspective view, partially broken away, showing a carriage mechanism formed in accordance with the invention.
FIG. 7 is a partial side view illustrating the mounting of a clamp or back-up carriage on a vertical carriage forming a part of the mechanical portion of the automated riveting machine illustrated in FIG. 1.

As will be appreciated from the foregoing discussion, the vertical carriages 69 are generally box-shaped structures open on both of the ends that lie parallel to the subassembly to be riveted. In order to prevent undue strain on the motor 119, and prevent the motor from overheating due to the "hunting" action that occurs when a relatively large structure is moved by a relatively small motor, the vertical carriage 69 is counterbalanced. The counterbalance mechanism is best illustrated in FIG. 6 and comprises counterbalance weights 135 mounted in the vertical columns 71 of the horizontal carriage, which are hollow. The counterbalance weights 135 are coupled to the vertical carriage 113 by cables 137 that pass over pulleys 139 mounted atop the upper plate 73 of the horizontal carriage, as illustrated in FIG. 5. While not clearly illustrated in the drawings for reasons of clarity, a counterbalance mechanism is located on each side of both vertical carriages.

Mounted in one vertical carriage 69 for movement toward and away from the major subassembly is a clamp carriage 141. Mounted in the other vertical carriage is a back-up carriage 142. Since, except for their driving mechanisms, the clamp and back-up carriages are identical, only one of these carriages—the clamp carriage—is illustrated and described in detail. In this regard, it should be noted that the horizontal and vertical carriages of the front and rear carriage mechanisms 63 and 65 are, or course, identical.

The clamp carriage 141 is best illustrated in FIG. 6 and comprises a base 143, a front wall 145, sidewalls 147 and a top wall 149. The base 143 is substantially longer than the top wall 149 in the direction of movement. The base overlies the lower channel 101 and the rear cross member 115 of the vertical carriage. The edge of the sidewalls 147 of the clamp carriage are vertical in the front (i.e., where they face the major subassembly) and diverge downwardly from the top wall 149 toward the base 143. The base 143 extends beyond the outer lower tip of the sidewalls 147, as shown best in FIG. 7.

The front wall 145 of the clamp carriage 141 includes a centrally located, outwardly projecting truncated cone 151. The tip of the truncated cone 151 is flat and includes a cylindrical aperture 152. In addition, the sides of the truncated cone, in a horizontal plane, include slots 153. The slots start near the tip of the truncated cone and extend horizontally outwardly in the planar region of the front wall 145 and terminate in side circular apertures 155. The tips of the operative elements of the invention, which are hereinafter described, as including a position sensor, a drill, a rivet inserter, and an upset mechanism, lie coplanar with the slots 153.

As noted above, the base 143 of the clamp carriage 141 lies above the lower channel 101 and the cross member 115 of the vertical carriage 69. Projecting downwardly from the base 143 are one or more flanges 157. The flanges include circular apertures that slidably surround guide rods 159 that extend between the lower channel 101 and the cross member 115 of the vertical carriage 69. Preferably, the flanges 157 and the guide rods 159 support the clamp carriage 141 so that the lower surface of the base 143 of the clamp carriage lies atop the lower channel 101 and the cross member 115 of the vertical carriage 69. In such an arrangement, the flanges and the guide rods, while providing some support, primarily function to prevent the clamp carriage from skewing. Alternatively, provided enough flanges are included, the clamp carriage may be entirely supported by the flanges and guide rods, as well as guided by these elements.

While the clamp and back-up carriages are generally the same, the mechanism for moving the clamp carriages toward and away from the major subassembly is different, as noted above. Specifically, the clamp carriage 141, which forms part of the front carriage mechanism 63, is pneumatically positioned and the back-up carriage, which forms part of the rear carriage mechanism 65, is electrically positioned. More specifically, projecting downwardly from the base 143 of the clamp carriage 141 are two spaced apart flanges 161, only one of which can be seen in FIG. 7. The flanges 161 are connected to the outer ends of horizontally arrayed shafts 163. The shafts 163 are operated by and form part of pneumatic actuators 165. The pneumatic actuators are supported by the cross member 115 of the vertical carriage 69. The longitudinal axes of the shafts 163 of the pneumatic actuators, of course, lie parallel to the direction of movement of the clamp carriage 141. That is, the axes of the shafts 163 of the pneumatic actuators 165 lie orthogonal to the plane generally defined by the major subassembly, as shown in FIG. 8.

The mechanism for moving the back-up carriage 142, as shown schematically in FIG. 8, comprises a threaded shaft 167 journalled in and extending between the lower channel 101 and the cross member 115 of the vertical carriage of the rear carriage mechanism 65. The axis of the threaded shaft 167 lies parallel to the direction of movement of the back-up carriage, i.e., orthogonal to the plane generally defined by the major subassembly. Mounted on the outer surface of the cross member 115 of the vertical carriage is a motor 169. The shaft of the motor is horizontal and coupled to the threaded shaft 167. Extending downwardly from the base 143 of the back-up carriage 142 is a flange 168. The flange supports a nut that is threaded onto the threaded shaft 167. As a result, when the motor is actuated to cause the shaft to rotate, the back-up carriage is moved back and forth, i.e., toward and away from the major subassembly.

The mechanisms for moving the clamp and back-up carriages are different because, as will be better understood from the following discussion, the back-up carriage must be precisely positioned against the "rear"

surface of the major subassembly. After being so positioned, the clamp carriage is pressed against the "front" surface of the major subassembly with a prescribed amount of force (800 lbs, for example), which is created by the pneumatic actuators 165. This applied force presses the part together at a rivet location during the drilling, inserting and fastener securing (e.g., rivet upsetting) steps hereinafter described in detail. It is the applied force that eliminates the prior art requirement that the parts be disassembled after drilling to remove burrs.

Mounted on both the clamp carriage 141 and the back-up carriage 142 is a shuttle carriage 171. More specifically, mounted adjacent the sidewalls 147 of the clamp and back-up carriages are pairs of support blocks 173. One pair of support blocks lies near the front wall 145 of the clamp and back-up carriages and a second pair lies midway between the front and rear of the base 143. Extending between the pairs of support blocks 173 are support rods 175. The support rods 175 lie orthogonal to the direction of movement of the clamp and back-up carriages. The shuttle carriage 171 includes a base 177 that overlies the support rods 175. Projecting downwardly from the base 177 of the shuttle carriage 171 are bearing blocks 179, which are mounted on the supported rods 175. Thus, the shuttle carriage 171 is supported by the support rods 175 via the bearing blocks 179. Mounted on flanges 181 projecting upwardly from the bases 143 of the clamp and back-up carriages 141 and 142 are pairs of pneumatic actuators 183 and 185. The pneumatic actuators 183 and 185 are mounted so that their shafts lie parallel to the rods 175 that support the shuttle carriage 171. The outer ends of the shafts of the pneumatic actuators 183 and 185 coact with flanges (not shown) that project downwardly from the lower surface of the base 177 of the shuttle carriage 171. As a result, actuation of the pneumatic actuators 183 and 185, in one direction or the other, causes the shuttle carriage 171 to move in one direction or the other. Preferably the pneumatic actuators function such that: (a) when they are both retracted the shuttle carriage is in a first position; (b) when one actuator is extended, the shuttle carriage is moved to a second position; and, (c) when the other actuator is extended, the shuttle carriage is moved to a third position. (If only two positions are needed, such as the case with the shuttle carriage mounted on the back-up carriage, only a single pneumatic actuator is needed.)

Extending upwardly from the base 177 of each shuttle carriage 171 along the front and rear edges thereof are front and rear flanges 187 and 189. Extending between the front and rear flanges 187 and 189 are two pairs of support rods 191. One pair of support rods is located on one side of the shuttle carriage 171 and the other pair is located on the other side. Mounted on each pair of support rods is a shuttle 193. Mounted on the rear flange 189 of the shuttle carriage 171, between each pair of support rods 191, is a pneumatic actuator 195. The actuators are mounted such that their shafts lie in a horizontal plane. The outer ends of the shafts of the pneumatic actuators 195 are connected to their respective shuttles 193.

Mounted on the one shuttle 193 of each shuttle carriage is one part of a two part rivet upset mechanism 196a and 196b. For example, each shuttle may support one of a pair of electromagnetic rivet guns of the type described in U.S. Pat. No. 3,811,313, entitled "Electromagnetic High Energy Impact Apparatus" by Hendrik P. Schut. Alternatively, the shuttle of one carriage may support a single impact air rivet gun of the type described in U.S. patent application, Ser. No. 930,456, entitled "Single Impact Rivet Gun", filed Aug. 2, 1978 by Rune E. B. Raman, And the shuttle of the other shuttle carriage may support a bucking bar adapted to coact with a single impact rivet gun. As necessary for an understanding of this invention, the information contained in U.S. Pat. No. 3,811,313 and U.S. patent application Ser. No. 930,456 is incorporated herein by reference. (Obviously, if fasteners other than rivets are to be installed, the rivet upset mechanism 196a and 196b must be replaced by other types of fastener securing mechanisms, as determined by the type of fastener to be installed.)

Mounted on the other shuttle 193 of the clamp carriage is a drill 198, for example a Hause Holomatic drill produced by Hause Machines Inc., Montpelier, Ohio. Mounted on the other shuttle of the back-up carriage is a part contact sensor 200. Mounted on the shuttle carriage between the two shuttles 193 of the clamp carriage is a pneumatic cylinder 197. Mounted in the pneumatic cylinder 197 is a hollow rod 199. The pneumatic cylinder is mounted such that the rod 199 can be moved in the direction of movement of the clamp carriage 141, i.e., toward and away from the major subassembly to be riveted. The hollow shaft forms the inserter of a rivet supply mechanism 203.

At this point, it will be appreciated that a mechanism for positioning riveting tools (e.g., a part contact sensor, a drill, a rivet inserter and an upset mechanism) has been described. The positioning mechanism provides movement along three orthogonal axes, which can be defined as the X, Y and Z axers. Assuming that the X axis represents a horizontal axis lying generally parallel to the major subassembly, the Y axis represents a vertical axis and the Z axis represents a horizontal axis toward and away from the major subassembly, the horizontal carriages are movable in the X axis direction, the vertical carriages are movable in the Y axis direction and the clamp and back-up carriages are movable in the Z axis direction. Further, the shuttle carriages are movable in the X axis direction and the shuttles (and the inserter rod 199) are movable in the Z axis direction.

With respect to driving power, the horizontal carriages are moved bidirectionally by the rotation of the shafts of the motors 85 located near the lower ends of the horizontal carriages. The positions of the horizontal carriages are determined by the related encoders 99. The vertical carriages are bidirectionally moved by the motors 119 mounted atop the horizontal carriages. The positions of the vertical carriages are determined by the related encoders 131. The back-up carriage is bidirectionally moved by the back-up carriage motor 169. The position of the back-up carriage is determined by the output of an encodor (not shown in the mechanical mechanism drawings) driven by the shaft of the back-up carriage motor. The clamp carriage is pneumatically positioned by the clamp carriage pneumatic actuators 165. The position of the clamp carriage is determined by a suitable linear position sensing encoder (not shown in the mechanical mechanism drawings). The shuttle carriages are pneumatically positioned by the shuttle carriage pneumatic actuators 183 and 185 and the shuttles are pneumatically positioned by the shuttle pneumatic actuators 195.

While not illustrated in the mechanical mechanism drawings (e.g, FIGS. 1-8), preferably, a number of limit switches are included. Specifically, preferably, limit switches are located near the lower end of either side of the horizontal carriages 61 so as to impinge on arms or flanges mounted on the lower pedestal beam 25 near the ends of the main rack 91. As a result, if a horizontal carriage moves to an extreme position near either end of the main rack 91, the application of power to the horizontal carriage motor 85 can be automatically terminated based on the "tripping" of a limit switch. Similarly, limit switches may be mounted atop and beneath the vertical carriages so as to be actuated by flanges or arms mounted on the columns 71 of the horizontal carriages when a limit position is reached. The vertical carriage motor 119 is automatically deenergized when these limit switches are actuated. More important than the inclusion of the horizontal and vertical carriage limit switches is the inclusion of limit switches for the back-up and clamp carriages and for the shuttles. In this regard, clamp and back-up carriage limit switches are provided to indicate whether or not the clamp and back-up carriages are fully retracted, respectively. These limit switches may be mounted beneath the bases 143 of the back-up and clamp carriages and adapted to be actuated upon impingement on the cross member 115 of the vertical carriages. If desired, full forward limit switches may also be provided. With respect to the shuttles 193, retract limit switches are, preferably, mounted on the rear flanges 189 of the shuttle carriages 171 so as to coact with arms or flanges mounted on the shuttles 193. If desired, full forward limit switches may be mounted on the front flanges 187 of the shuttle carriages.

In addition to including limit switches for the horizontal and vertical carriages, the clamp and back-up carriages and the shuttles, preferably, position switches for the shuttle carriages are also included. While not illustrated in the mechanical drawing figures, preferably, the shuttle carriage position switches are mounted on the base 143 of the clamp and back-up carriages. The position switches are actuated by an arm attached to the related shuttle carriage. The position switches and actuating arms are position such that a paraticular position switch is actuated when a related tool is aligned with the cylindrical aperture 152 formed in the tip of the truncated cone 151 located in the front walls 145 of the clamp and back-up carriages. With respect to the clamp carriage, one position switch is actuated, e.g., closed, when the upset device 196a is aligned with the truncated cone, another actuated when the hollow rod 199 is aligned with the truncated cone and a third actuated when the drill 198 is aligned with the truncated cone. With respect to the back-up carriage, a first position switch is actuated when the back-up upset mechanism 196b is aligned with the truncated cone of the back-up carriage and a second position switch actuated when the part contact sensor is aligned with the truncated cone.

The limit switches and the position switches may be formed of single pole normally open (NO) switches or single pole normally closed (NC) switches depending upon the requirements of the control electronics used in an actual embodiment of the invention. While, as noted above, neither the limit nor the position switches are illustrated in the mechanical diagrams, these switches are illustrated in block form in FIG. 9, which is a composite (i.e., mechanical and electronic) block diagram of a preferred embodiment of an automated riveting machine formed in accordance with the invention.

It will be appreciated from the foregoing discussion that a number of pneumatic tubes and electrical control cables run to the carriages and shuttles. In order to prevent the tubes and cables from becoming tangled, the tubes and cables are guided to the horizontal carriages by power tracks 201 (FIG. 1). As will be understood by those skilled in the development of large scale industrial equipment, power tracks are relatively stiff, elongate, sprocketlike mechanisms that comprise a plurality of side plates and cross rods. The cross rods are adpated to support cables, tubes and the like. An example of a suitable power track is the Arrow-Trak (TM) produced by Arrow-Motive Manufacturing Company of Kalamazoo, Mich.

The relatively stiff power tracks 201 are support by horizontal channels 202 (formed of pairs of angles) located beneath the platforms 27 and 35. While not shown in the drawings for reasons of clarity, a second power track may extend upwardly from the base of the horizontal carriage, adjacent one of the vertical columns 71, to support the tubes and cables running to the vertical carriage and the items supported by the vertical carriage. Moreover, while not shown in the drawing, electrically operated pneumatic control valves may be mounted on the base 143 of the clamp and back-up carriages to control the flow of pneumatic power from a single pneumatic source to the various pneumatic actuators mounted on or associated with the vertical carriage, whereby only a single pneumatic tube need be supported by the power track(s).

The fasteners (e.g., rivets) to be inserted in the manner herein described are provided by the rivet supply mechanism 203 illustrated in FIG. 1. Since the rivet supply mechanism per se does not form part of this invention, it will not be described herein. A rivet supply mechanism suitable for selecting and delivering headed rivets is described in U.S. Pat. applications, Ser. No. 864,059, filed Dec. 23, 1977 by Brian R. Trethewy for "Dispensing Apparatus", Ser. No. 869,966, filed Jan. 16, 1978 by Kenneth E. Caley et al. for "Rivet Delivery and Locating Apparatus" and Ser. No. 929,073 filed July 31, 1978 by /A. Hameter et al. for "Fastener Selection System." As required for an understanding of the present invention, the information contained in those patent applications is incorporated herein by reference.

Slug rivets (i.e., nonheaded rivets) can be selected and delivered by a dispensing apparatus that vibrates bins of rivets. An aligning output trough coupled to each bin receives and aligns the rivets, and delivers them to a gate; and the gates release rivets one at time in accordance with rivet selection signals. The released rivets enter a pneumatic tube, which delivers them to the rivet inserter, in the manner described in the patent applications referred to in the preceding paragraph.

Figure 9:
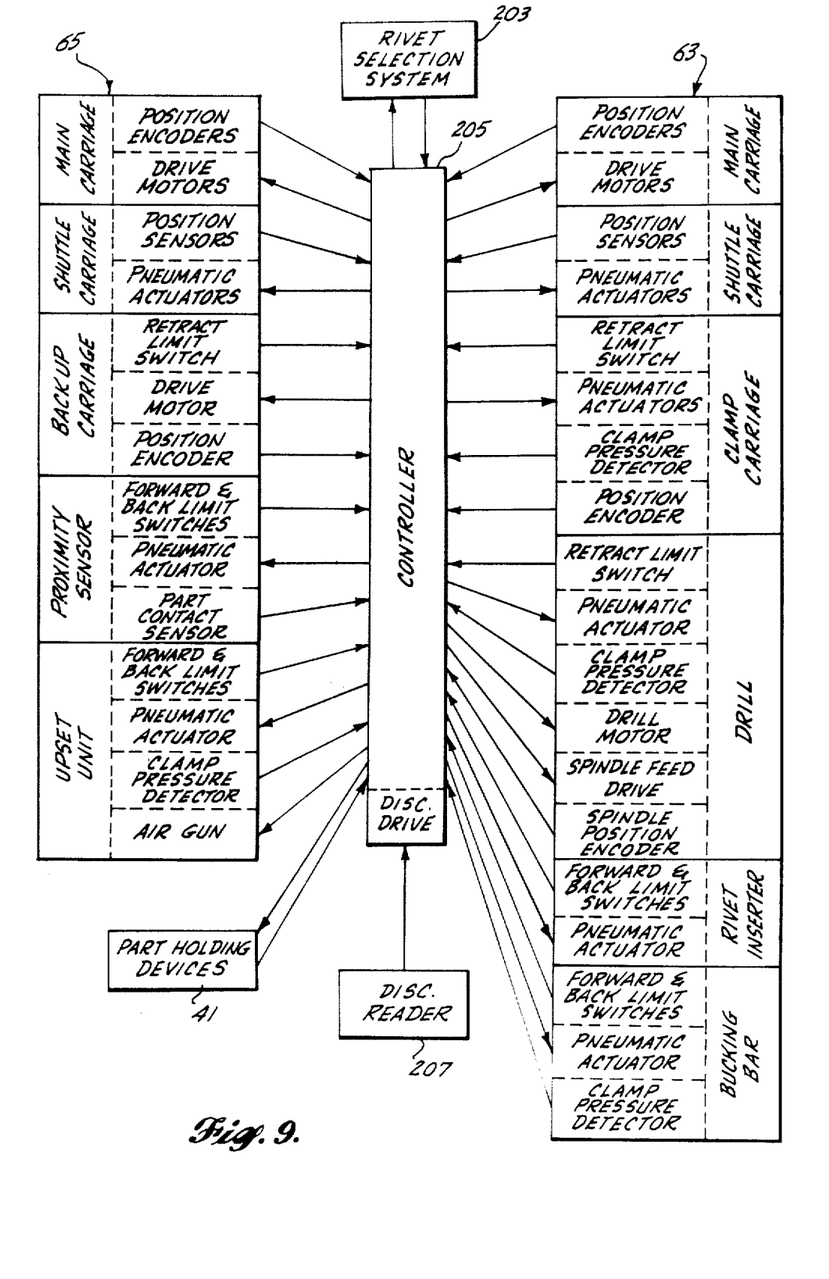
FIG. 9 is a block diagram of an automated assembly machine formed in accordance with the invention; and, FIGS. 10A–C comprise a flow diagram illustrating the operation of the controller illustrated in FIG. 9.

In addition to the mechanical portion illustrated in FIGS. 1-8, as noted above, the invention also includes an electronic control portion. The electronic control portion controls the operation of the mechanical portion. FIG. 9 is a block diagram showing both the mechanical electronic control portions of an overall automatic riveting system formed in accordance with the invention. In this system, rivets are upset using a single impact air gun (as opposed to a pair of electromagnetic riveters).

In FIG. 9, the rear carriage mechanism 65 is illustrated on the left and the front carriage mechanism 63 is illustrated on the right. The electronic control portion of the invention is illustrated as incluidng a controller 205, shown connected to the various items forming part of the front and rear carriage mechanism, for applying drive and control signals to the pertinent ones of these items (e.g., the motors and pneumatic actuators) and for receiving information from other items (e.g., the position sensors and swtiches and the limit switches). The controller 205 is also shown as connected to the rivet selection system 203 and to a disc reader 207. Further, the controller is shown as connected to the part holding devices 41 so that the controller can open the clamp arms thereof, as previously described. (The controller also receives open/closed signals from the clamp arms that denote the open or closed status of the arms. This information can be provided by appropriately mounted limit switches, if desired).

Figure 10A:
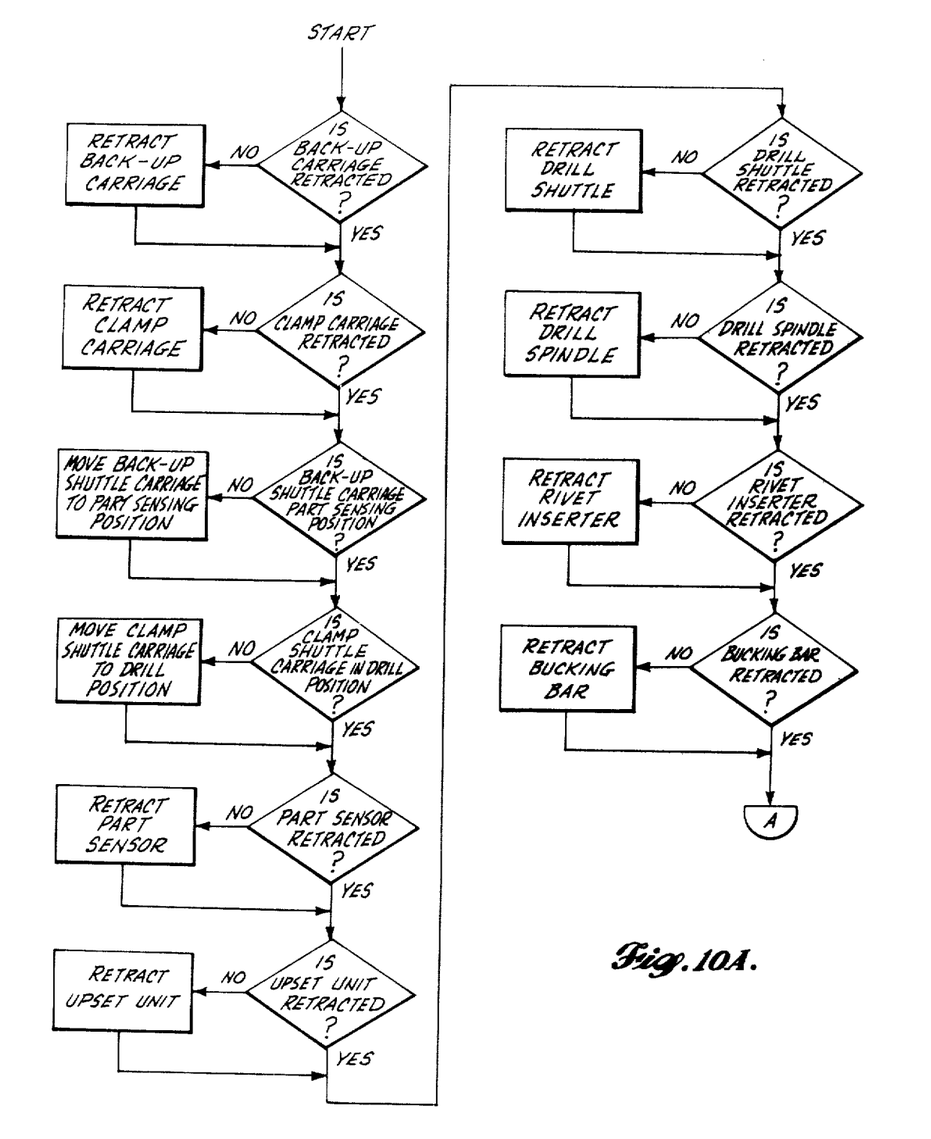
Figure 10B:
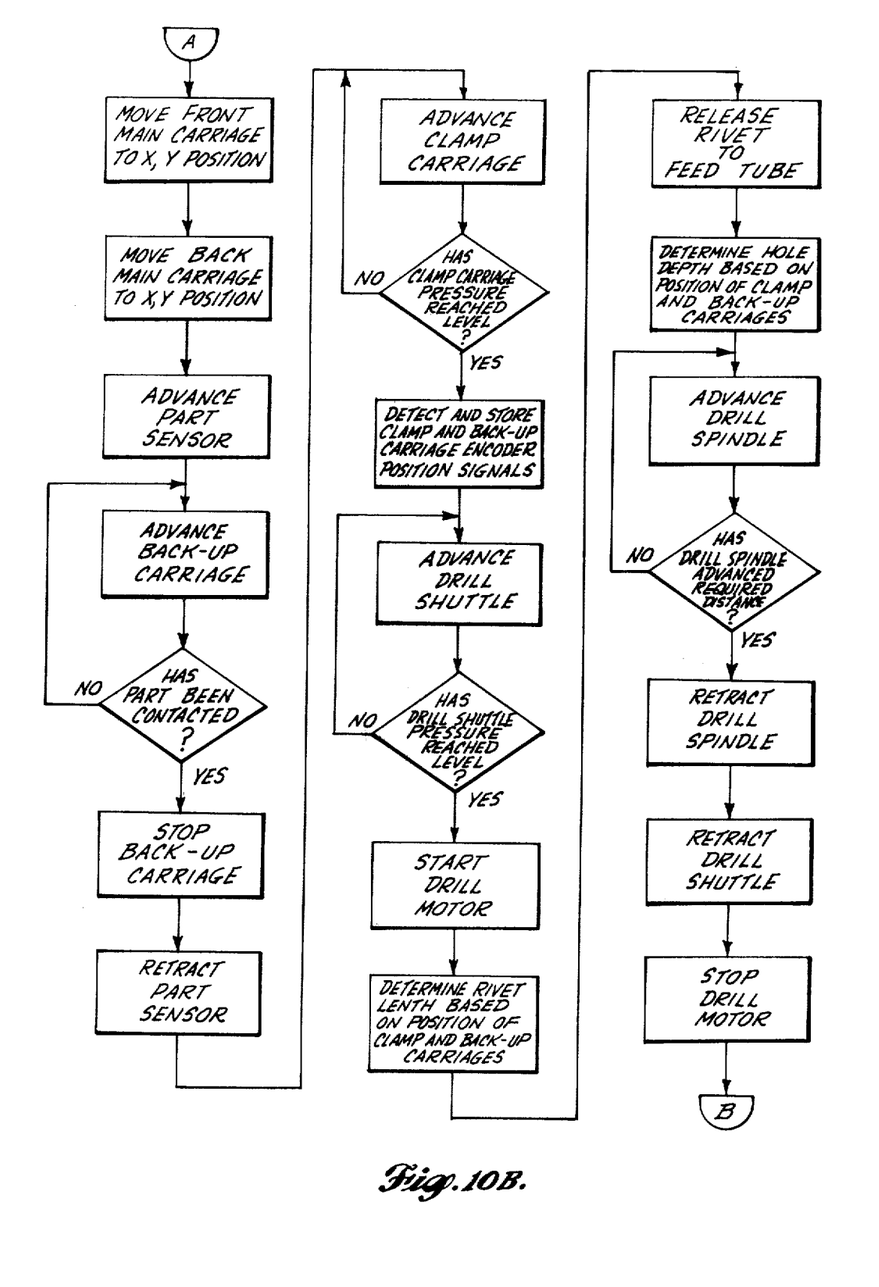
Figure 10C:
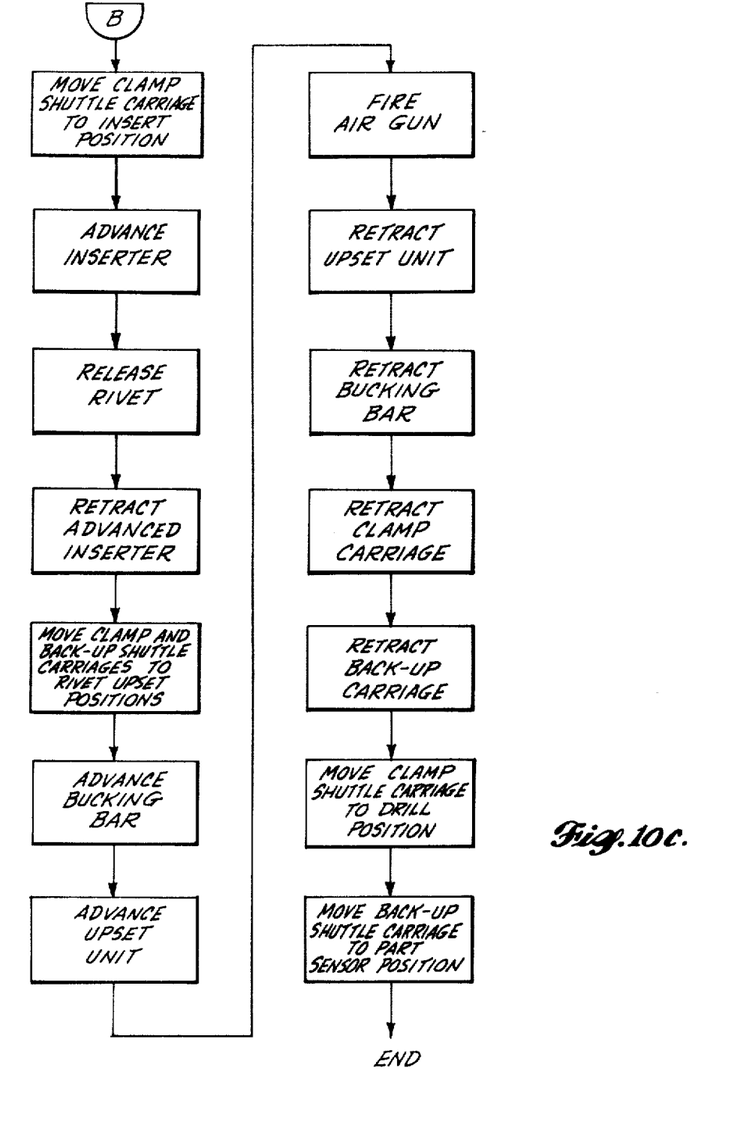

FIGS. 10A-C comprise a flow diagram illustrating the operation of an automated riveting machine of the type shown in block form in FIG. 9 during an automatic riveting sequence which occurs after the parts are tack riveted together in the manner hereinafter described in detail. After start-up, the controller first determines if the back-up and clamp carriages are retracted. If the back-up carriage is not retracted, the back-up carriage motor 169 is actuated, and the back-up is retracted until its retract limit switch is actuated. If the clamp carriage is not retracted, the clamp carriage pneumatic actuators 165 are actuated and the clamp carriage is retracted until the clamp carriage retract limit switch is actuated.

If the shuttle carriage 171 mounted on the back-up carriage 142 is not in the part sensing position, i.e., the part sensor 200 is not aligned with the aperture 152 in the truncated cone 151 formed in the front plate 145 of the backup carriage, the shuttle carriage is movved until such alignment occurs. This action is created by actuating the appropriate actuator 183 or 185 connected to the back-up shuttle carriage, until the appropriate position switch is actuated. That is, as previously noted, position switches are mounted on the upper surface of the base of back-up carriage. When the arm mounted on the shuttle carriage actuates the position switch indicating that the part sensor is aligned with the conical projection, the actuator moving the shuttle carriage is deactivated. Next, the shuttle carriage 171 mounted on the clamp carriage 141 is moved to the drill position. That is, the clamp shuttle carriage is moved until the drill 198 is aligned with the aperture in the truncated cone formed in the front wall 145 of the clamp carriage 141. When this position is reached the related actuator is deactivated. As with the back-up shuttle carriage, the correct position is determined when the appropriate position switch is actuated.

The next step in the sequence is to retract the part sensor 200. That is, if the part sensor is not in its retracted position, as determined by the state of a retract limit switch, the pneumatic actuator that controls the position of the part sensor is actuated. when the part sensor reaches its retracted position, this actuator is deactivated. Similarly, if the air upset unit 196b is not retracted, the actuator moving the shuttle on which the upset unit is mounted is activated until a limit switch indicates that the upset unit has been retracted. Similar actions take place for the drill 198, the drill spindle, the rivet inserter 197, and the bucking bar 196a. That is, if these items are mounted on shuttles, and the shuttles are not in their retracted position, the appropriate actuator is actuated until the shuttle is moved to its retracted position. If a particular item (such as the drill spindle and the rivet inserter) are operated by separate pneumatic actuators, the pneumatic actuators are actuated until a limit switch is actuated to indicate that the particular item has been retracted. With respect to the drill spindle, as will be readily appreciated by those familar with drills used in industrial environments, such as the Hause Holomatic drill reference above, such drills include spindles that are moved longitudinally to contrtol the drilling operation as the spindle is rotated. That is, the drill starts rotating in a retracted position. Then pneumatic force (or hydraulic or mechnaical force, depending upon the nature of the drill) pushes the spindle outwardly until the desired drill depth has been achieved. In any event, at this point it will be appreciated that all of the operative items have been determined to be in, or moved to, their "start" positions. (Obviously, the sequence illustrated in FIG. 10A is exemplary and should not be construed as limiting).

Turning now to FIG. 10B, the first step of the sequence of operations is to move the front and back main carriages to their appropriate position. This is accomplished by actuating, as necessary, the horizontal and vertical carriage drive motors, sensing the output of the horizontal and vertical carriage encoders and comparing this output with desired (encoded) position information. When the output of the encoders indicates that the desired position has been achieved, the horizontal and vertical carriage drive motors stop driving. At this point the truncated cones 151 of the clamp and back-up carriages are aligned with one another, as shown in FIG. 8.

The next step in the sequence is to advance the part sensor. The part sensor 200, which comprises a shaft having a spring-loaded end, is mounted on a shuttle, as previously described. The shuttle is moved by the shuttle's pneumatic actuator to a position such that the spring-loaded end projects just beyond the end of the truncated cone 151 formed in the front wall 145 of the back-up carriage 142. After the part sensor has been advanced to this position, the back-up carriage 142 is moved toward the major subassembly to be riveted, by actuating the electric motor 169 that moves the back-up carriage. Movement continues until the part touches the subassembly. When this action occurs, the spring-loaded element of the part sensor 200 is moved and actuates a switch. When the switch is actuated, the application of power to the back-up carriage motor 169 stops. As a result, the back-up carriage 142 stops. The distance the part sensor extends beyond the tip of the conical projection is set such that the spring loaded element of the part sensor trips the switch at a point such that the tip of the truncated cone 151 of the back-up carriage just touches the surface of the major subassembly when movement of the back-up carriage stops.

Returning to FIG. 10B, after the back-up carriage has stopped, the part sensor 200 is retracted. Retraction is complete when the retract limit switch related to the part sensor is actuated.

The next step in the sequence is to advance the clamp carriage 141. This action occurs by energizing the actuators 165 that move the clamp carriage. The clamp carriage 141 is moved until the tip of the truncated cone 151 of the clamp carriage 141 is pressed against the subassembly to be riveted with an adequate amount of force, e.g., 800 lbs. Since the conical tips of the back-up and clamp carriages are aligned, the parts are held together with a predetermined amount of force, created by the clamp carriage actuators. When the desired force has been reached, encoders (not shown) connected to the backup and clamp carriages are read. The thusly detected positions of these carriages are stored.

As illustrated in FIG. 10B, the next step in the sequence is to advance the drill 198 toward the subassembly. This is accomplished by moving the shuttle on which the drill is mounted toward the major subassembly. The drill shuttle is advanced until the drill tip is near the part, which is determined when the pressure applied by the pneumatic actuator moving the shuttle reaches a particular level. The next step is to start the drill motor. At the same time, rivet length is determined based on the position of the clamp and back-up carriages, and a suitable length rivet is released from the rivet selection mechanism 203 and applied via a feed tube to the rivet inserter 197. Further, the depth of the hole necessary to be drilled is determined based on the position of the clamp and back-up carriages 141 and 142. By this time, the drill 198 is up to speed and the drill spindle is advanced. After the drill spindle has advanced the required distance and the hole drilled, the drill spindle is retracted. The next steps are to retract the drill 198 and stop the drill motor.

To summarize, at this point, the thickness of the parts to be riveted together has been determined, a hole has been drilled and the desired length rivet has been selected and moved to a position for insertion. Both the part sensor 200 and the drill 198 have been retracted and the drill has been stopped.

As illustrated in FIG. 10C, the next step in the sequence is to move the clamp shuttle carriage to the insert position. This is accomplished by energizing the appropriate shuttle actuator until the appropriate position switch indicates that the rivet inserter 197 is aligned with the truncated cone 151 of the clamp carriage 141 and thus, with the previously drilled hole in the major subassembly. When this position is reached, the inserter is advanced by the actuation of the pneumatic actuator associated with the inserter. As a result, the rivet is moved into the hole in the subassembly. It is pointed out here that, preferably, the air gun embodiment of the invention being described upsets a modified universal head rivet. Obviously, these rivets are oriented in the inserter such that the head is located on the clamp carriage side of the major subasssembly. After the rivet has been released, the inserter is retracted.

The next step in the sequence is to move the clamp and back-up shuttle carriages 171 to the rivet upset positions. This is accomplished by moving the clamp shuttle carriage 171 until the bucking bar is aligned with the clamp carriage truncated cone 151 and the back-up shuttle carriage 171 until the upset unit is aligned with the back-up carriage truncated cone 151. After these positions have been reached, which is accomplished by actuating the appropriate shuttle carriage pneumatic actuators and deactivating the actuators when the appropriate position switches indicate that the shuttle carriages are in the appropriate positions, the bucking bar shuttle is advanced until the tip of the bucking bar 196a contacts the head of the rivet. Similarly, the upset unit shuttle is advanced until the tip of the air gun upset unit 196b contacts the nonheaded end of the rivet. Thereafter, the air gun upset unit if fired.

After the rivet has been upset, the upset unit and the bucking bar shuttles are retracted. Thereafter, the clamp and back-up carriages 141 and 142 are retracted. Finally, the clamp shuttle carriage is moved (shuttled) to the drill position and the back-up shuttle carriage is moved (shuttled) to the part sensing position. At this point, the sequence of operations is complete and the system recycles.

As indicated above, if desired, electromagnetic (EMR) upset units, as opposed to air operated upset units, can be utilized by the invention. Preferably, EMR upset units are utilized when nonheaded rivets (e.g., slugs) are desired, rather than headed rivets. In such an embodiments of the invention, one EMR upset unit replaces the air-operated upset unit and a second EMR upset unit replaces the bucking bar. In operation, the EMR unit mounted on the back-up carriage is aligned with the conical projection of the back-up carriage and advanced to a position where the tip of that EMR upset unit is spaced by a predetermined amount from the major subassembly, prior to the rivet being inserted. As a result, when the rivet is inserted (by air pressure), it is not driven through the hole. After the rivet has been inserted, the EMR upset unit mounted on the clamp carriage is aligned with the conical projection of the clamp carriage and, then, advanced until its tip impinges on the other side of the slug. Thereafter, the EMR upset units are simultaneously energized and the rivet is upset. Other than these changes, an EMR upset unit embodiment of the invention operates in a manner identical to the operation of the air gun embodiment illustrated in FIGS. 10A–C and previously described.

In addition to riveting structures together, obviously, the illustrated embodiment of the invention can be used to merely drill holes at predetermined locations, if desired. In such instances, of course, only the steps up to the hole drilling step are followed. Further, the illustrated embodiment can be used to insert bolts, as well as rivets. When an air upset mechanism is used to insert bolts, the sequence of steps illustrated above is followed, except that, rather than inserting a rivet, a bolt is inserted and the bucking bar is moved to a position where it meets the tip of the bolt, as opposed to the head of the rivet. When an EMR upset unit is used during a bolt insertion sequence, only a single EMR unit is used. The other EMR unit is replaced by a bucking bar located on the side of the major subassembly from which the threaded shaft of the bolt is to project, i.e., the clamp carriage side.

Turning now to a description of the method of the invention followed during the assembly of a major subassembly, specifically a wing spar, carried out by the automated assembly machine formed in accordance with the invention and described above. First positioning tools are mounted on the pedestals 39. The positioning tools may comprise bars (not shown) mounted between selected pairs of pedestals. For example, pedestal pairs separated by 5-10 feet may be chosen. Each bar includes a horizontal pin positioned so as to lie between the part holding devices 41 mounted on the pedestals. If the bars are precisely positioned, the pins will be precisely positioned.

Next the web 45 is positioned by mounting the web on the pins of the positioning bars. More specifically, the web 45 includes a few precisely preformed holes that cause the web to be correctly mounted when the pins of the positioning bars are located in the holes.

Following the mounting of the web 45, the chords 47 are mounted. (Prior to being mounted, the surface of the chord that joins the web may have a sealant or adhesive applied thereto, if desired.) The chords are mounted by placing them in the support blocks 52 and closing the clamp arms 58. Next, preferably, the controller 205 is actuated and goes through a tack riveting sequence during which the chords are tack riveted to the web at selected points. The tack riveting sequence is the same as the final riveting sequence described above, except that only a few rivets are installed.

The next step in the sequence is to mount the stringers 49. First the controller causes alignment holes to be drilled, preferably where the stringers and the chords overlap. Next, the stringers are mounted by manually installing fasteners in the alignment holes and predrilled holes precisely positioned in the stringers. (If desired, an adhesive may be applied to the surfaces of the stringers that face the web and/or the chords). After the stringers are manually mounted, the controller can be actuated to cause center rivets to be installed in each stringer. Thereafter, the controller is actuated to install rivets along the chords and webs at preselected intervals. Preferably the shortest path of travel is chosen. For example, rivets may be installed while moving down the first stringer, then across the section of the lower chord between the first and second stringers, then up the second stringer, then across the section of the upper chord between the second and third stringers, etc.

While rivets of different lengths can be installed during a single pass (and return), such rivets must be of the same diameter. If rivets of different diameters are to be installed, additional passes must be made, with appropriate tool (e.g., diameter drill) changes being made between passes. If special fasteners, such as steel fasteners (as opposed to the aluminum rivets used in most assembly regions of an aircraft) are needed in high strength areas, they are manually installed using conventional equipment. However, if, for example, temperatory rivets, such as those used to tack the stringers in place, need to be removed in order to install the special rivets, the rivets to be removed can be removed by using the invention in a drill only mode of operation.

It will be appreciated from the foregoing description that the invention provides a method and apparatus for automatically assembling major subassemblies. The components of the subassembly are quickly and rapidly positioned and tack fastened together. Thereafter, additional fasteners are installed. The components are automatically fastened by: clamping the components together at each fastener location; determining the thickness of the components at the fastener location; drilling a hole through the clamped components; inserting a fastener; and, securing the fastener. The apparatus is controlled by a numerical controller such that a plurality of fasteners are rapidly and quickly installed at predetermined positions of the major subassemblies, without requiring that the subassembly be disassembled at any time. In addition to rivets, studbolts can be inserted at desired positions. Further, other types of well known fasteners can be installed by replacing the rivet upset mechanism with other suitable fastener securing mechanisms.

It will be appreciated that while a preferred embodiment of the invention has been illustrated and described, various changes can be made therein without departing from the spirit and scope of the invention, as discussed above. Hence, the invention can be practiced otherwise than as specifically described herein.

The embodiments of the invention in which an exclusive property or privilege is claimed are defined as follows:

1. A method of automating the assembly of the components of a major subassembly comprising the steps of:

(a) mounting a major component of a major subassembly in a predetermined position;
(b) securing other components of said major subassembly in predetermined positions related to the predetermined position of said major component;
(c) creating alignment holes in said other and major components;
(d) locating still further components with respect to said other and major components using said created alignment holes; and,
(e) permanently fastening said still further, other and major components together by sequentially performing at each location where a fastener is to be installed in said still further, other and major components the substeps of:
  (i) creating a hole,
  (ii) inserting a fastener in said hole; and,
  (iii) securing said inserted fastener,
prior to performing these substeps at another location.

2. The method of automating the assembly of the components of a major subassembly as claimed in claim 1 wherein said other components are tack attached to said major component.

3. The method of automating the assembly of the components of a major subassembly as claimed in claim 2 wherein said still further components include preformed alignment holes and wherein said step of locating said still further components with respect to said other and major components comprises the substeps of:
aligning said preformed alignment holes in said still further components with said created alignment holes in said other and major components;
inserting fasteners in said aligned preformed and created alignment holes; and,
securing said fasteners.

4. The method of automating the assembly of the components of major subassemblies as claimed in claim 3 wherein said step of permanently fastening said still further, other and major components together also includes the substeps of: determining the thickness of said still further, other and major components at each of said predetermined locations; and, selecting a fastener of suitable length for installation prior to installing a fastener in a hole.

5. The method of automating the assembly of the components of major subassemblies as claimed in claim 2 wherein said step of permanently fastening said still further, other and major components together also includes the substeps of: determining the thickness of said still further, other and major components at each of said predetermined locations; and, selecting a fastener of suitable length for installation prior to installing a fastener in a hole.

6. The method of automating the assembly of the components of a major subassembly as claimed in claim 2 wherein said step of tack attaching said other components to said major component comprises the substeps of:
drilling holes at predetermined locations in said other and major components;
inserting a rivet in said holes; and,
upsetting said rivets.

7. The method of automating the assembly of the components of a major subassembly as claimed in claim 6 wherein said still further components include preformed alignment holes and wherein said step of locating said still further components to said other and major components comprises the substeps of:

aligning said preformed alignment holes in said still further components with said created alignment holes in said other and major components;

inserting rivets in said aligned preformed and created alignment holes; and, upsetting said rivets.

8. The method of automating the assembly of the components of major subassemblies as claimed in claim 7 wherein said step of permanently fastening said still further, other and major components together also includes the steps of: determining the thickness of said still further, other and major components at each of said predetermined locations; and, selecting a rivet of suitable length for installation prior to installing a rivet in a hole.

* * * * *